Figure 1:
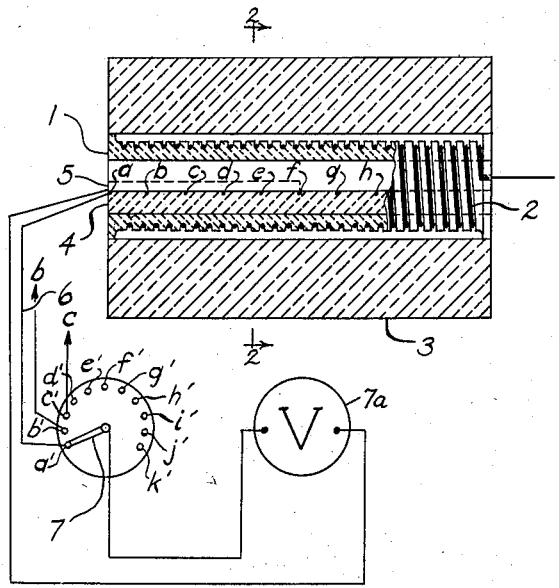

March 4, 1958     R. LE G. STONE     2,825,222
DEVICE FOR TEMPERATURE GRADIENT METHOD OF SAMPLE TESTING
Filed Jan. 4, 1954

Robert Le Grand Stone
INVENTOR.

2,825,222
DEVICE FOR TEMPERATURE GRADIENT METHOD OF SAMPLE TESTING

Robert Le Grande Stone, Austin, Tex.

Application January 4, 1954, Serial No. 402,059

5 Claims. (Cl. 73—15)

My invention relates to improvements in devices for determining proper firing temperatures for ceramic materials and the like.

A primary requirement in the attainment of optimum use of ceramic materials, when the desired characteristics of the material are to be attained by heat treatment, is to determine accurately the effect on the material of various intensities of heat application. The common method is to make a series of identical samples, test each one in turn at differing temperatures in a suitable furnace having means for varying the amount of heat applied, record for each sample the heat attained during its firing period, and then observe from the series of fired specimens the one giving most nearly the desired results. Commercial production would then proceed upon the basis of firing to the temperature that was observed for the best of the test specimens.

Disadvantages of the described test method are the time involved in separately testing a large series of samples, the possibility of missing the optimum firing temperature if only a few samples at widely varying temperatures are tested, and difficulty in determining the temperature actually attained in the sample as distinguished from the temperature of the recording point within the furnace. This latter difficulty applies whether the heat treatment be in such a low range that measurement may be accomplished with mercury thermometers, or at a high range requiring platinum alloy thermocouples or the like as measuring devices. The reason is that there exists within the furnace and within the sample itself a temperature gradient in all directions, and the gradient will change in character as the maximum temperature is varied. Even though the measuring device be applied directly against the face of the sample, there remains an element of uncertainty as to the quantitative influence of material within the sample which is at a different temperature than is the surface. In addition, the material of the measuring device will itself conduct away more or less heat depending upon its mass and conductivity, and thus influence the observed temperature at the measuring point.

In an attempt to overcome the loss of time involved in separate testing of individual samples, there was conceived a method of subjecting an elongated sample to a varying gradient of temperature from a high value at one end, to a low value at the other. This was accomplished in a so-called tube furnace, which in its common form comprises a ceramic tube of convenient length having wound thereon a heating coil of heavy duty electrical resistance wire, both the tube and winding being surrounded in turn by heavy thermal insulation to minimize any lateral heat loss. The effect is to create a maximum temperature at the longitudinal center of the tube, with a gradual drop toward room temperatures at both exposed ends of the tube. To measure the temperature gradient a thermocouple was mounted upon a rod which could be moved into the tube furnace above the sample to hold the thermocouple at measured distances from the outer end long enough to obtain a stabilized reading. From the several readings a curve of temperature could be drawn and then compared with the observed results of the firing along the length of the sample. While this method assured a continuous record of firing results between the extremes of temperature from one end of the sample to the other, there still remained a lack of assurance that observed temperatures corresponded with sufficient accuracy to those actually existing in the sample at the various measured distances from the end.

My invention provides a means for determining the actual temperatures in every portion of the elongated sample with an accuracy heretofore unknown in the art, and in addition, enables this to be accomplished under a greatly accelerated test procedure.

Figure 2:
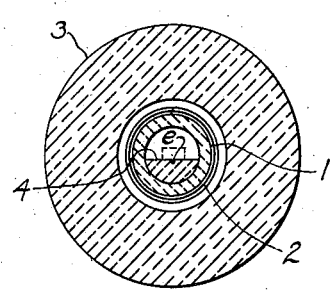
Figure 3:
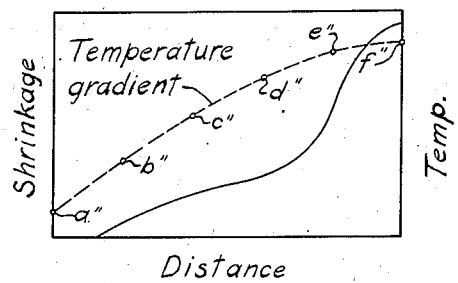
Figure 4:
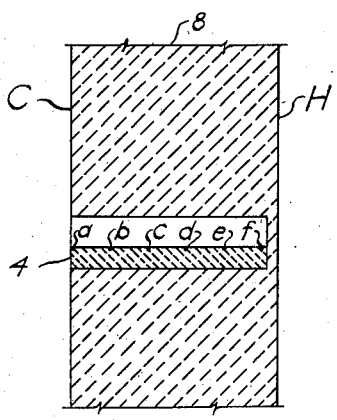

To more particularly describe my invention reference is had to the attached drawings, in which:

Fig. 1 is a longitudinal section through a small tube furnace with my invention embodied therein, plus a partial representation of the observing circuits, Fig. 2 is a transverse section of the tube furnace on the line 2—2 in Fig. 1, Fig. 3 is a graph illustrating the type of data which is obtained in a greatly improved manner by use of my invention, and Fig. 4 is a section showing an alternative application of my invention in the wall of a large kiln, or the like.

The tube furnace of Fig. 1 has at its center the tube element 1 in which samples may be placed to be tested. About this tube is wound the heating element 2 which will be suitably connected to a controlled source of electrical current to enable the heating of tube 1 to any desired temperature within the capability of the furnace. A heat insulating covering 3 prevents any substantial amount of heat from being conducted or radiated laterally from the tube and winding, and thus forces a substantially unidirectional flow of heat from the hottest point at the middle of tube 1 toward both ends where it can be dissipated. As a consequence there occurs within the tube 1 a temperature gradient dropping more or less uniformly from the high value at the middle to some lower value at the ends. This gradient will vary according to what material is placed within the tube and according to the amount of heat input from heating coil 2.

To enable the testing of samples under accurately known conditions, I provide a preferably removable, rod or base 4, shaped to fit within tube 1, and made of material conforming in heat conducting qualities substantially with those of the samples 5 to be tested. In the upper surface of the base 4 are embedded a line of thermocouple beads, $a$, $b$, $c$, etc. Each bead is connected, by appropriate wiring in the base 4 and extending therefrom, to suitable indicating instruments which will show the temperature at the location of the bead. It has been found convenient to use a single platinum ground wire extending longitudinally in base 4 and to fuse to it at the points $a$, $b$, $c$, etc. a series of platinum-rhodium alloy wires. These wires are brought out to convenient terminals just outside the furnace, from which the circuits are extended by compensated copper leads, one of which is represented at 6, to a rotary selector switch 7 and to an indicating meter 7a or a potentiometer circuit (not shown) for determining the temperature. The ground wire would, of course, bypass the selector switch. With this circuit the several temperatures may be observed in quick succession by turning the selector to the appropriate terminal $a'$, $b'$, etc. If it were considered necessary to have a continuous record of the temperature at each point, it could be accomplished by a two-wire circuit from each point to an appropriate continuous recorder.

Since the tube furnace as shown has a dropping temperature gradient from the middle toward both ends, it is convenient to simultaneously test therein two samples laid end to end.

The graph shown in Fig. 3 illustrates the plotting of the temperature gradient through the points $a''$, $b''$, $c''$, etc. which represent the temperatures observed at the corresponding thermocouple points $a$, $b$, $c$, etc. These temperatures would be observed according to whatever time sequence was considered significant for the samples being tested. Following the heat treatment, the sample would be studied for such items as areas with the proper glaze, the thickness or width would be calipered to determine the percent of shrinkage, and the information then entered into the graph according to the measured distance from the end of the sample to the point of the observed effect. By reference to the temperature gradient it can then be determined with certainty within what range of firing temperature the desired qualities may be attained.

In some cases the longitudinal restraint consequent upon using a single elongated sample may seriously detract from the accuracy of shrinkage observations. In such instances it has been found preferable to spot a series of discrete samples along the base 4.

Fig. 4 illustrates an alternative form of my invention which would be of advantage in connection with a continuously-operating commercial producing unit. An elongated opening corresponding to the tube of Fig. 1 may be provided part way through the wall 8 of a large furnace or kiln, and the series of temperature indicating points appropriately mounted therein in a removable base 4, or otherwise, so as to be closely adjacent to a sample which would be placed in the opening for testing. In this embodiment the flow of heat from the hot side H of the furnace wall toward the cold side C provides a substantially unidirectional temperature gradient. This arrangement would lack the flexibility of the tube furnace of Fig. 1 in that the temperature gradient could not readily be altered for an extended range of testing, but would be entirely suitable for routine quality-control tests or the like.

No doubt other applications of my invention will occur to those skilled in the art.

I claim:

1. In a device for testing the response of materials to degrees of heat treatment, an elongated ceramic rod adapted to be placed in a heated area of the device, said heated area having a temperature gradient in the direction of elongation of said rod, said rod having one surface shaped to closely engage an elongated specimen of said materials, a series of temperature responsive elements mounted in said elongated rod adjacent to said one surface, and means for indicating the temperature of the respective temperature responsive elements.

2. In a device for testing the response of materials to degrees of heat treatment, an elongated ceramic rod adapted to be placed in a heated area of the device, said heated area having a temperature gradient in the direction of elongation of said rod, said rod having one surface shaped to closely engage a series of specimens of said materials spaced generally along a singular axis, the singular axis being parallel to the direction of elongation of said rod, a series of temperature responsive elements mounted in said elongated rod adjacent to said one surface, and means for indicating the temperature of the respective temperature responsive elements.

3. In a device for testing the response of materials to degrees of heat treatment, an elongated ceramic support disposed in a heated area of the device, said heated area having a temperature gradient in the direction of elongation of said support, said support having one surface shaped to closely engage specimens of said materials, a series of temperature responsive elements mounted in said elongated support adjacent to said one surface, and means for indicating the temperature of the respective temperature responsive elements.

4. In a device for testing the response of material to degrees of heat treatment, an elongated support adapted to be placed in a heated area of the device, said heated area having a temperature gradient in the direction of elongation of said support, said support having one surface shaped to closely engage an elongated specimen of said material, said support formed of a material having thermal properties substantially conforming to those of said material being tested, a series of temperature responsive elements mounted in said elongated support adjacent to said one surface, and means for indicating the temperature of the respective temperature responsive elements.

5. In a furnace for heat testing materials, a generally elongated tube-shaped furnace chamber, said furnace chamber being open at least at one end, means for heating the furnace chamber and providing a temperature gradient along the length thereof, an elongated ceramic rod disposed in the furnace chamber, said rod having its upper surface shaped to closely engage specimens of said materials placed thereon, a series of temperature responsive elements mounted in said elongated rod adjacent to said upper surface, and means for indicating the temperature of the respective temperature responsive elements.

References Cited in the file of this patent

UNITED STATES PATENTS

| | | |
|---|---|---|
| 1,558,828 | Brace | Oct. 27, 1925 |
| 1,775,682 | Martin | Sept. 16, 1930 |
| 2,015,838 | Borden et al. | Oct. 1, 1935 |
| 2,336,238 | Fordyce et al. | Dec. 7, 1943 |

FOREIGN PATENTS

| | | |
|---|---|---|
| 437,434 | Germany | Nov. 23, 1936 |